United States Patent
Förg et al.

(10) Patent No.: US 12,516,520 B2
(45) Date of Patent: Jan. 6, 2026

(54) SEALING DEVICE FOR AN EDGE JOINT AND DRYWALL

(71) Applicant: Hilti Aktiengesellschaft, Schaan (LI)

(72) Inventors: Christian Förg, Buchloe (DE); Manfred Klein, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 144 days.

(21) Appl. No.: 18/042,480

(22) PCT Filed: Aug. 20, 2021

(86) PCT No.: PCT/EP2021/073169
§ 371 (c)(1),
(2) Date: Feb. 22, 2023

(87) PCT Pub. No.: WO2022/043222
PCT Pub. Date: Mar. 3, 2022

(65) Prior Publication Data
US 2023/0323655 A1    Oct. 12, 2023

(30) Foreign Application Priority Data

Aug. 24, 2020  (EP) ..................................... 20192382
Mar. 15, 2021  (EP) ..................................... 21162520
Mar. 15, 2021  (EP) ..................................... 21162522

(51) Int. Cl.
*E04B 1/68*     (2006.01)
*B32B 5/18*     (2006.01)
(Continued)

(52) U.S. Cl.
CPC ............. *E04B 1/6812* (2013.01); *B32B 5/18* (2013.01); *B32B 27/065* (2013.01);
(Continued)

(58) Field of Classification Search
CPC ........ E04B 1/68; E04B 1/6812; E04B 1/6815; E04B 1/947; E04B 1/948; E04B 2001/6818
(Continued)

(56) References Cited

U.S. PATENT DOCUMENTS 4,977,018 A     12/1990  Irrgeher et al.
5,686,174 A  *  11/1997  Irrgeher ................. E04B 1/6812
                                                 428/313.5

(Continued)

FOREIGN PATENT DOCUMENTS

CA       3058865 A1  *  7/2020  ........... E04B 2/7457
DE      102008063371      12/2009
(Continued)

OTHER PUBLICATIONS

Förg et al., U.S. Appl. No. 18/041,664, filed Feb. 14, 2023.
(Continued)

*Primary Examiner* — Ryan D Kwiecinski
(74) *Attorney, Agent, or Firm* — Grüneberg and Myers PLLC

(57) ABSTRACT

A sealing device can be used for at least one edge joint, which is formed between a floor, a wall, or a ceiling and an adjacent cladding of drywall having cladding. The sealing device contains a sealing profile with a base body for sealing the at least one edge joint on the cladding. The base body has a sealing web which forms a lateral contact surface for the cladding.

20 Claims, 1 Drawing Sheet

(51) Int. Cl.
  *B32B 27/06*  (2006.01)
  *B32B 38/00*  (2006.01)
  *E04B 1/94*  (2006.01)
  *E04B 2/74*  (2006.01)

(52) U.S. Cl.
  CPC ........ *B32B 38/0004* (2013.01); *E04B 2/7409* (2013.01); *B32B 2266/06* (2013.01); *B32B 2581/00* (2013.01); *E04B 1/947* (2013.01); *E04B 1/948* (2013.01)

(58) Field of Classification Search
  USPC ...................................................... 52/1, 232
  See application file for complete search history.

(56) References Cited

U.S. PATENT DOCUMENTS

| | | | |
|---|---|---|---|
| 8,640,415 B2 | 2/2014 | Pilz et al. | |
| 8,793,947 B2 | 8/2014 | Pilz et al. | |
| 9,290,932 B2 | 3/2016 | Pilz et al. | |
| 9,683,364 B2 | 6/2017 | Pilz et al. | |
| 10,184,246 B2 | 1/2019 | Pilz et al. | |
| 11,060,283 B2 | 7/2021 | Pilz et al. | |
| 11,136,767 B2 | 10/2021 | Förg et al. | |
| 11,891,800 B2 * | 2/2024 | Pilz .................. | E04B 2/7411 |
| 11,905,705 B2 | 2/2024 | Pilz et al. | |
| 2009/0246498 A1 * | 10/2009 | Deiss ................ | E04B 1/68 428/220 |
| 2011/0120038 A1 * | 5/2011 | Wormann .......... | E04B 1/6812 52/309.4 |
| 2016/0130802 A1 * | 5/2016 | Pilz .................. | E04B 1/948 52/483.1 |
| 2017/0198473 A1 * | 7/2017 | Pilz .................. | E04B 2/7411 |
| 2018/0030727 A1 * | 2/2018 | Klein ................ | E04B 2/7411 |
| 2019/0376300 A1 * | 12/2019 | Förg ................. | E04B 1/6812 |
| 2021/0010257 A1 * | 1/2021 | Klein ................ | E04B 1/82 |
| 2022/0056686 A1 * | 2/2022 | Pilz .................. | E04B 1/947 |
| 2022/0098854 A1 * | 3/2022 | Förg ................. | E04B 2/7411 |
| 2023/0323656 A1 * | 10/2023 | Förg ................. | B32B 27/065 52/396.06 |
| 2023/0323657 A1 * | 10/2023 | Förg ................. | E04B 1/947 52/232 |
| 2024/0263444 A1 | 8/2024 | Pilz et al. | |

FOREIGN PATENT DOCUMENTS

| | | | | |
|---|---|---|---|---|
| DE | 102008063371 A1 * | 12/2009 | ............... | E06B 1/64 |
| EP | 0317833 | 5/1989 | | |
| EP | 0317833 A1 * | 5/1989 | ........... | E04B 1/6812 |
| EP | 2354410 | 8/2011 | | |
| EP | 2354410 A2 * | 8/2011 | ............... | E06B 1/62 |
| EP | 3388591 | 10/2018 | | |
| EP | 3388591 A1 * | 10/2018 | ........... | E04F 19/022 |
| EP | 3628789 A1 * | 4/2020 | ........... | E04B 1/6812 |
| WO | WO-2015071486 A2 * | 5/2015 | ........... | E04B 2/7411 |
| WO | WO-2022043216 A1 * | 3/2022 | ........... | E04B 2/7457 |

OTHER PUBLICATIONS

Förg et al., U.S. Appl. No. 18/041,675, filed Feb. 14, 2023.
Förg et al., U.S. Appl. No. 18/042,467, filed Feb. 22, 2023.
Förg et al., U.S. Appl. No. 18/042,498, filed Feb. 22, 2023.
Förg et al., U.S. Appl. No. 18/042,634, filed Feb. 23, 2023.
Förg et al., U.S. Appl. No. 18/042,767, filed Feb. 23, 2023.
U.S. Appl. No. 18/041,664, filed Feb. 14, 2023, Förg et al.
U.S. Appl. No. 18/042,498, filed Feb. 22, 2023, Förg et al.
U.S. Appl. No. 18/041,675, filed Feb. 14, 2023, Förg et al.
U.S. Appl. No. 18/042,634, filed Feb. 23, 2023, Förg et al.
U.S. Appl. No. 18/042,767, filed Feb. 23, 2023, Förg et al.
U.S. Appl. No. 18/042,467, filed Feb. 23, 2023, Förg et al.
International Search Report dated Dec. 3, 2021, in PCT/EP2021/073169, with English translation, 5 pages.
Written Opinion dated Dec. 3, 2021, in PCT/EP2021/073169, with English translation, 10 pages.
Hilti, "Bottom Track Seal CFS-BTS", Product Information, CFS-BTS 5/8" and CFS-BTS 1-1/4", Sep. 2023, 1 page.
Cemco®, "Hotrod® BW Compressible Firestop", Product Description, Feb. 11, 2025, 2 pages.
Cemco®, "Smoke & Sound Stop Blue (SSSB)", Product Description, Feb. 11, 2025, 2 pages.
"XHBN—Joint Systems: XHBN7—Joint Systems Certified for Canada", System No. BW-S-0024, UL Product IQ®, Sep. 6, 2024, 4 pages.
Blaze Foam, Intumescent compressible Firestop Foam, for Head of Wall Applications—Dynamic & Static, Blazing Fast Firestop Installation, RectorSeal, 2018, 2 pages.

* cited by examiner

SEALING DEVICE FOR AN EDGE JOINT AND DRYWALL

CROSS-REFERENCE TO RELATED APPLICATIONS

This application is the National Stage entry under § 371 of International Application No. PCT/EP2021/073169, filed on Aug. 20, 2021, and which claims the benefit of priority to European Application No. 20192382.8, filed on Aug. 24, 2020, priority to European Application Ser. No. 21162522.3, filed on Mar. 15, 2021, and priority to European Application No. 21162520.7, filed on Mar. 15, 2021. The content of each of these applications is hereby incorporated by reference in its entirety.

BACKGROUND OF THE INVENTION

Field of the Invention

The invention relates to a sealing device for at least one edge joint, which is formed between a floor, a wall, or a ceiling and an adjacent first cladding and a spaced-apart second cladding of drywall having cladding. Furthermore, the invention relates to drywall having a sealing device of this type and a first cladding, which forms a first wall surface of the drywall, and a second cladding, which forms a second wall surface of the drywall, which second wall surface is opposite to the first wall surface.

Description of Related Art

Edge joints, in particular floor joints, are designed to provide sound decoupling of the drywall from adjacent walls, ceilings, or floors, in particular floorings.

The wall surfaces of the drywalls are formed by cladding parts such as gypsum boards, which often have to be protected from moisture. The edge joints therefore also form a barrier that protects the cladding parts against rising moisture, for example in the event of a pipe burst.

Drywalls, which are provided, for example, as partition walls, each have a cladding on their two opposite wall sides. Two corresponding edge joints on the opposite wall sides of the drywall each form an edge joint.

The edge joints are usually sprayed with a sealing compound in order to provide a sound and fire protection function and to seal the joint against air and odors.

Sealing compounds have the disadvantage that the application is time-consuming and not very ergonomic. Furthermore, sealing compounds can usually only be used reliably at temperatures of at least 5° C. and the substrate must be dry. The inspection is not easy either, since, for example, the installation depth cannot be checked non-destructively.

SUMMARY OF THE INVENTION

The object of the invention is to provide a sealing device for at least one edge joint of drywall, which ensures easy assembly of the sealing device and effective sealing of the at least one edge joint.

To achieve the object, a sealing device for at least one edge joint is provided, which is formed between a floor, a wall, or a ceiling and an adjacent first cladding and, if necessary, a spaced-apart second cladding of drywall having cladding.

It was recognized that a sealing device of this type can be installed with little effort and forms an effective seal for at least one, but preferably for both edge joints of the drywall having cladding. The fastening portion ensures that the sealing device is reliably fastened to the holding rail of the drywall and is aligned in a defined manner on the cladding, while the base body seals and closes the edge joint with a specified width. Thus, the cladding on each side of the drywall having double-layer cladding is preferably effectively protected from moisture from an adjacent floor, wall, or ceiling by the corresponding base body of the sealing profile.

DETAILED DESCRIPTION OF THE INVENTION

Figure 1:
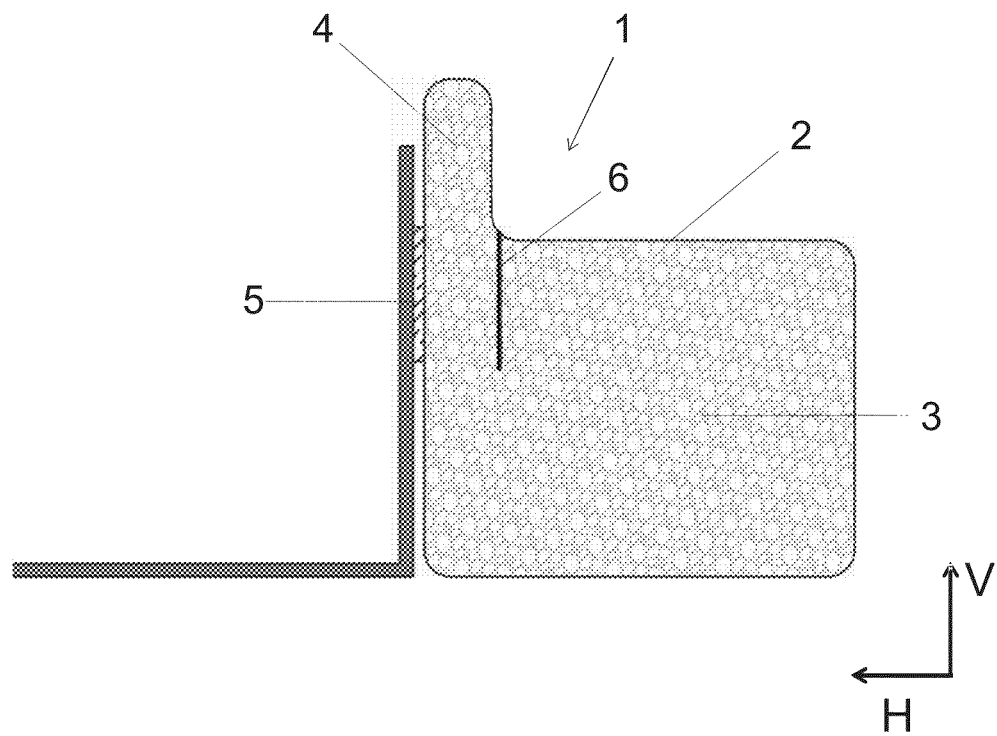
FIG. 1 is a schematic sectional view of a sealing device according to the invention.

In one embodiment, the sealing profile has a sealing web extending away from the base body. In this case, the sealing web forms a lateral contact surface for the cladding and is configured to seal a gap between the holding rail of the drywall and the cladding. The sealing web forms a further sealing plane, whereby the edge joint is sealed particularly effectively by the sealing profile. Furthermore, the sealing web ensures that the sealing profile is aligned in a defined manner on the cladding.

Furthermore, the sealing profile preferably has a slit which allows an easy assembly of the sealing profile on the holding rail of the drywall. This slit extends perpendicularly and adjacent to the sealing web over about half of the base body.

Furthermore, in the direction of extent of the profile, the sealing profile can have at least one fastening portion which forms a positioning aid. The position of drywall is usually marked for assembly on the floor in order to ensure a fixed route for the drywall. The fastening portion is used for easy attachment to the holding rail, the sealing profile being reliably aligned along a marking with little effort. The fastening portion is preferably positioned on the sealing web.

According to a further embodiment, the sealing profile is an extrusion profile, as a result of which the sealing device can be produced with little effort and in any length.

The sealing profile can be formed in one piece and from a foam material or an elastomer. As a result, the sealing profile can be produced inexpensively and also has a particularly high sealing effect.

In a preferred embodiment, the sealing profile comprises open-cell and closed-cell foam. In a particularly preferred embodiment, the sealing profile is constructed in layers from a foam material, two closed-cell foam material layers enclosing an open-cell foam material layer. In a particularly preferred embodiment, the sealing profile consists of an intumescent foam material.

According to the invention, drywall comprising a sealing device according to the invention with the aforementioned advantages is also provided to achieve the above-mentioned object. The drywall further comprises a holding rail, a first cladding forms a first wall surface of the drywall, and a second cladding forms a second wall surface of the drywall, which second wall surface is opposite to the first wall surface. The first cladding rests with its circumferential side against the support of the base body and the second cladding rests with its circumferential side against the support of a further base body. In this way, the edge joints, which are formed between the floor, wall, or ceiling and the first cladding and the second cladding can be sealed reliably and with little effort by the sealing device.

Figure 2:
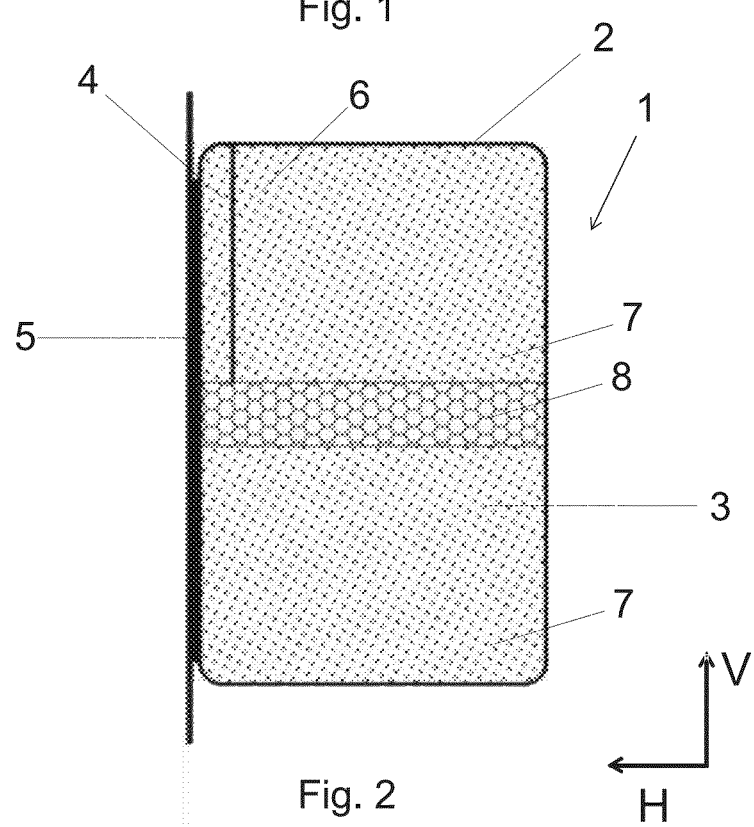
FIG. 2 is a schematic sectional view of a sealing device according to the invention in accordance with a further embodiment.

Further advantages and features emerge from the following description and from the accompanying drawings. In the drawings:

FIG. 1 is a schematic sectional view of a sealing device according to the invention, and FIG. 2 is a schematic sectional view of a sealing device according to the invention in accordance with a further embodiment.

When the sealing device is used, drywall having double-layer cladding is preferably provided with a first cladding and a second cladding, each of which forms one of the two oppositely arranged wall surfaces of the drywall. The drywall also comprises a stand construction with a holding rail. The holding rail is preferably a floor profile that is firmly anchored on the floor, for example by means of dowels.

The wall surfaces usually have a single-layer cladding, i.e. the first and the second cladding each have a cladding part (gypsum wall) in the horizontal direction H.

In principle, in an alternative embodiment, the first and/or the second cladding of the drywall can have a plurality of cladding parts in the horizontal direction H, i.e. each of the wall surfaces can have multiple layers of cladding, in particular with two adjacent cladding parts in the horizontal direction H.

The first and the second cladding are each attached to the stand construction at a distance from the floor in the vertical direction V, as a result of which a double edge joint is formed with a first edge joint and a second edge joint. The first edge joint is formed in the form of a floor joint between a circumferential side of the first cladding and the floor, while the second edge joint is formed in the form of a floor joint between a circumferential side of the second cladding and the floor.

In order to seal the edge joints, the drywall also has a sealing device 1, the structure of which is described below with reference to FIG. 1. The sealing device 1 is also suitable for sealing at least one edge joint between the drywall and the ceiling and/or wall.

The sealing device 1 has a one-piece sealing profile 2 with a base body 3 and a sealing web 4. The sealing web 4 forms a support against which the corresponding cladding rests. The sealing web 4 extends perpendicularly away from the base body 3. The base body 3 forms the sealing portion of the sealing device 1, which sealing portion seals the edge joint. In particular, the cladding rests in this case with its circumferential side against a support of the base body.

The sealing web 4 extends in the vertical direction V in each case into a gap which is formed between the holding rail and the edge of the inner end face of the corresponding cladding adjacent to the circumferential side.

The sealing device 1 is an extruded profile. The sealing profile 2 consists of a plastics material, for example EPDM, PE foam, PP foam, PS foam, or particle foam. In principle, the sealing device 1 can be made of any material and in any way. Preferably, however, at least the sealing profile 2 is an extruded profile.

Furthermore, the sealing profile 2 can be sheathed at least in portions with a film.

In order to reliably seal the edge joint with the sealing device 1, the holding rail is aligned on the floor during the assembly of the drywall and then anchored in the floor. The sealing device 1 is provided separately from the holding rail and is fastened thereto via the fastening portion 5, preferably with an adhesive or a self-adhesive tape or other adhesive.

The cladding is now set up with its circumferential side on the sealing web 4, so that the edge of the end face rests against the sealing web 4 and the base body 3 is pressed against the floor, and is then fastened to the stand construction.

The possible further second cladding is fastened by means of a second sealing device 1 in an analogous manner opposite to the first cladding on the stand construction.

Since each cladding is placed on the sealing device 1 during assembly, it is ensured that the two edge joints each have a defined width in the vertical direction V, while the weight of the cladding ensures that each base body 3 rests sealingly against the floor.

In principle, the sealing device 1 can be used to seal any edge joint that is formed between the circumferential sides of two spaced-apart claddings and an adjacent floor, wall, or ceiling.

A sealing device according to a further embodiment will now be described with reference to FIG. 2.

In contrast to the embodiment shown in FIG. 1, the sealing device 1 has a sealing web 4 which is flush with an upper side of the base body 3. The sealing profile 2 is constructed in layers from a foam material, wherein two closed-cell foam material layers 7 enclose an open-cell foam material layer 8. In a particularly preferred embodiment, the sealing profile consists of an intumescent foam material.

The sealing profile 2 of the sealing device 1 has a slit 6 in FIG. 1 and in FIG. 2, which preferably extends perpendicularly and adjacent to the sealing web 4 over approximately half of the base body 3.

Alternatively, the sealing device 1 can also have any number of intumescent strips which are provided at any point on the sealing device. Intumescent strips can also be provided as a fire protection function, which strips are arranged, for example, in a recess in the base body. Additionally or alternatively, the sealing profile 2 can be formed from a material that comprises further fire protection additives.

In all embodiments, a fire protection design without intumescent strips or without intumescent material can be provided, in particular if the sealing profile 2 is formed from a temperature-resistant material.

Furthermore, the sealing device 1 ensures effective sealing of the edge joint with respect to air and sound. The sealing device 1 turns the drywall into a fire-safe construction, by means of which smoke, temperature, and fire can be prevented from spreading over to the side of the drywall that faces away from the fire.

The base body 3 of the sealing profile 2 ensures a defined joint width and also protects the cladding against moisture in or on the floor, in particular during the construction phase.

Furthermore, the sealing device 1 is a factory-made application solution with constant properties, which makes the sealing of edge joints with a consistently high quality easier.

The invention is not limited to the embodiments shown. In particular, individual features of one embodiment can be combined in any way with features of other embodiments, in particular independently of the other features of the corresponding embodiments.

Furthermore, each sealing device can be configured for single-layer and/or double-layer cladding.

The invention claimed is:

1. A sealing device for at least one edge joint formed between a floor, a wall, or a ceiling and an adjacent cladding of drywall, the sealing device comprising:
   a sealing profile having a base body for sealing the at least one edge joint on the cladding,
   wherein the base body has a sealing web which forms a lateral contact surface for the cladding,
   wherein the sealing profile has a fastening portion in a direction of extent of the sealing profile,
   wherein the fastening portion is positioned on the sealing web,
   wherein the fastening portion is a distinct element from the sealing web, not coextensive with the sealing web, and adapted to form a positioning aid,
   wherein the sealing profile other than the fastening portion is formed in one piece and formed from a foam material or an elastomer,
   wherein the sealing profile has a slit, and
   wherein the slit extends parallel and adjacent to the sealing web over approximately half of the base body.

2. The sealing device according to claim 1, wherein the sealing web extends perpendicularly away from the base body.

3. The sealing device according to claim 1, wherein the sealing web is configured to seal a gap between a holding rail of the drywall and the cladding.

4. The sealing device according to claim 1, wherein the sealing profile is constructed in layers from a foam material, and wherein the sealing profile comprises two closed-cell foam material layers enclosing an open-cell foam material layer.

5. The sealing device according to claim 1, wherein the sealing device is an extrusion profile.

6. The sealing device according to claim 1, wherein the fastening portion is arranged to be able make contact with the cladding.

7. The sealing device according to claim 1, wherein the sealing profile comprise open-cell and closed-cell foam.

8. The sealing device according to claim 1, wherein the sealing profile consists of an intumescent foam material.

9. The sealing device according to claim 1, wherein the sealing profile is constructed in layers from a two closed-cell foam material layers enclosing an open-cell foam material layer.

10. The sealing device according to claim 1, which further comprises one or more intumescent strips.

11. The sealing device according to claim 1, wherein the sealing profile is configured to compress in a vertical direction when installed between the holding rail and the drywall cladding.

12. The sealing device according to claim 1, wherein the sealing profile deforms upon compression to form an L-shaped configuration.

13. The sealing device according to claim 1, wherein the compression of the sealing profile effects sealing in both vertical and lateral directions.

14. A combination including the sealing device according to claim 1, wherein the sealing web extends in a vertical direction into a gap which is formed between a holding rail and an edge of an inner end face of the cladding adjacent to a circumferential side.

15. Drywall, comprising:
   the sealing device according to claim 1,
   a holding rail,
   a first cladding, which forms a first wall surface of the drywall, and
   a second cladding, which forms a second wall surface of the drywall opposite to the first wall surface,
   wherein the first cladding and the second cladding rest with a circumferential side in each case against a support of the base body.

16. The drywall according to claim 15, wherein the sealing web extends away from the base body, and wherein the sealing web forms a lateral contact surface for a corresponding cladding and seals a gap between the holding rail of the drywall and the corresponding cladding.

17. An edge joint formed between a floor, a wall, or a ceiling and an adjacent cladding of drywall, sealed with a sealing device comprising:
   a sealing profile having a base body for sealing the at least one edge joint on the cladding,
   wherein the base body has a sealing web which forms a lateral contact surface for the cladding,
   wherein the sealing profile has a fastening portion in a direction of extent of the sealing profile,
   wherein the fastening portion is positioned on the sealing web,
   wherein the fastening portion is a distinct element from the sealing web, not coextensive with the sealing web, and adapted to form a positioning aid,
   wherein the sealing profile other than the fastening portion is formed in one piece and formed from a foam material or an elastomer,
   wherein the sealing profile has a slit, and
   wherein the slit extends parallel and adjacent to the sealing web over approximately half of the base body.

18. The edge joint according to claim 17, wherein the sealing profile is configured to compress in a vertical direction when installed between the holding rail and the drywall cladding.

19. A method for forming at least one edge joint between a floor, a wall, or a ceiling and an adjacent cladding of drywall, comprising sealing with a sealing device comprising:
   a sealing profile having a base body for sealing the at least one edge joint on the cladding,
   wherein the base body has a sealing web which forms a lateral contact surface for the cladding,
   wherein the sealing profile has a fastening portion in a direction of extent of the sealing profile,
   wherein the fastening portion is positioned on the sealing web, and
   wherein the fastening portion is a distinct element from the sealing web, not coextensive with the sealing web, and adapted to form a positioning aid,
   wherein the sealing profile other than the fastening portion is formed in one piece and formed from a foam material or an elastomer,
   wherein the sealing profile has a slit, and
   wherein the slit extends parallel and adjacent to the sealing web over approximately half of the base body.

20. The method according to claim 19, wherein the compression of the sealing profile results in sealing in both vertical and lateral directions.

* * * * *